United States Patent [19]

Ferm

[11] 3,775,147
[45] Nov. 27, 1973

[54] WHITE MULCH COMPOSITION
[75] Inventor: Richard L. Ferm, Lafayette, Calif.
[73] Assignee: Chevron Research Company, San Francisco, Calif.
[22] Filed: Dec. 30, 1971
[21] Appl. No.: 214,449

Related U.S. Application Data
[63] Continuation-in-part of Ser. No. 3,531, Jan. 16, 1970, abandoned.

[52] U.S. Cl.............. 106/271, 47/9, 260/28.5 A, 260/28.5 AV
[51] Int. Cl............................................. C08h 9/08
[58] Field of Search............................ 106/271, 272

[56] References Cited
UNITED STATES PATENTS
| | | | |
|---|---|---|---|
| 2,626,870 | 1/1953 | Cooke | 106/272 |
| 3,582,366 | 6/1971 | Brieger | 106/271 |
| 3,086,870 | 4/1963 | Sheldahl | 106/271 |
| 3,071,479 | 1/1963 | Fulenwider | 106/271 |
| 3,328,325 | 6/1967 | Zdanowski | 260/28.5 R |
| 3,108,441 | 10/1963 | Watson | 106/271 |
| 2,801,983 | 8/1957 | Dixon | 260/41 A |
| 2,961,799 | 11/1960 | Coe | 47/9 |
| 3,261,127 | 7/1966 | Ferm | 47/58 |

Primary Examiner—Allan Lieberman
Assistant Examiner—P. R. Michl
Attorney—James A. Buchanan, Jr. et al.

[57] ABSTRACT

A white mulch is provided comprised of from 10 to 60 parts of a whitening agent, from three to 11 parts of a binder, from zero to one part of a stabilizer, and from 87 to 28 parts of water.

The white mulch is useful for maintaining soil at a lower temperature during germination of crops.

1 Claim, No Drawings

WHITE MULCH COMPOSITION

CROSS REFERENCE TO RELATED APPLICATION

This is a continuation-in-part of my application Ser. No. 3,531, filed Jan. 16, 1970 and now abandoned.

BACKGROUND OF THE INVENTION

1. Field of the Invention

In many regions, some crops cannot be planted in the hot summer months because the high temperatures preclude seed germination. Historically, in regions such as the Imperial Valley in California, farmers have been forced to plant in the spring or early summer before hot weather arrives. If they plant during the hot weather, they have to maintain constant irrigation until the crop germinates and emerges, or the seeds will suffer biological damage, i.e., become burned and fail to germinate. It is known, for instance, that sugar beet seeds will not germinate satisfactorily if the temperature of the soil is above 90° F. Similar difficulties occur in the case of tomatoes, lettuce, melons, carrots, and a number of other plants.

Irrigation, if continuous, is effective to maintain the temperature of the soil at a satisfactory level. This is, however, a highly uneconomical method when used in arid areas and, additionally, contributes to the build-up of salinity in the soil, thus diminishing its suitability for cultivation. A more satisfactory method of keeping the seeds cool so that germination will occur would be to treat the soil with some kind of insulative or reflective material.

Characteristics which are desirable in a soil-cooling mulch coating include low cost; high heat reflective and/or insulative properties and, conversely, low heat conductivity; stability with regard to wind, rain, sunlight, and oxidation; stability with respect to maintenance of reflecting and insulating properties (imperviousness to attack by chemicals in the soil); "porosity" to allow the germinating seeds to sprout and push through; and non-phytotoxicity.

A particularly advantageous property for mulch coatings is the ability to be readily applied, using standard spray equipment readily available to the farmer. In conjunction with this, if the spraying formulation can be easily prepared by mixing with water at the field to be treated, only the solids used in the preparation of the spraying formulation will need to be transported thereby materially reducing transportation costs.

While in the past, various compositions have been used to reduce the temperature of soils, applicant is unaware of any previously known mulch composition which provides the excellent combination of properties which have been described.

2. Description of the Prior Art

The use of a reflective material which can be applied to the soil is described in U.S. Pat. No. 3,382,610, where a composition consisting of a bituminous non-phytotoxic binder, aluminum pigment, and a liquid petroleum hydrocarbon solvent are applied to the soil at the rate of at least 0.1 pound per square yard of the seeded soil surface, up to about 3 pounds per square yard. The composition acts to cool the soil by reflection of the sun's rays by the aluminum flakes which rise to the surface of the coating as the solvent evaporates. The essentially impervious seal also prevents the escape of moisture from the soil into the air.

U.S. Pat. No. 2,961,799 teaches treating soils with a latex composition to prevent soil erosion. It is suggested that light or dark colored materials may be incorporated therein to reflect or absorb the rays of the sun.

U.S. Pat. No. 3,261,127 teaches the treatment of soil to prevent crusting by use of an aqueous emulsion of polybutene. It is suggested therein that pigments may be incorporated to cool or warm the soil.

SUMMARY OF THE INVENTION

A white mulch is provided which comprises a dispersion of a whitening agent and a binder in water.

Various stabilizers may be added in minor amounts to prevent separation or settling of the dispersed materials.

The white mulch will generally be applied at the rate of about 100 to about 800 gallons per acre for complete coverage. On a weight basis this corresponds to from about 400 to about 3,400 pounds of solids per acre.

DETAILED DESCRIPTION OF THE INVENTION

The Pre-Application Composition

The white mulch of this invention comprises basically a whitening agent and a binder dispersed in water. The composition may optionally contain a stabilizer for prevention of separation or settling of the dispersion.

The invention encompasses both (1) the dilute white mulch (DWM) ready for application and (2) a concentrate white mulch (CWM) which can be mixed with water at the point of use to reduce transportation costs. It should be understood that no sharp line demarks the boundary between DWM and CWM. The applied white mulch coating after it has dried is also considered a part of this invention. All parts hereafter are by weight.

The invention broadly encompasses a composition of (1) from 10 to about 60 parts of a whitening agent, (2) from about three to about 11 parts of a binder, (3) preferably from zero to about one part of a stabilizer but may be as high as about five parts without detrimental effects, and (4) from about 87 to about 28 parts of water with the proviso that the amount of water present is such as to result in the composition being made up of 100 parts.

The DWM, ready for application, comprises (1) from about 10–30 parts by weight of a whitening agent, (2) from about three to about six parts by weight of a binder, and (3) from about 87 to about 67 parts by weight of water with the proviso that the amount of water present is such as to result in a total mixture of 100 parts by weight. The stabilizer may be used in an amount ranging from zero to about 0.5 parts by weight.

The CWM will comprise (1) from about 30 to about 60 parts by weight of a whitening agent, (2) from about three to about 11 parts by weight of the binder, and (3) from about 67 to about 29 parts by weight of water with the proviso that the amount of water present is such as to result in a total mixture of 100 parts by weight.

From about zero to about one part by weight of a stabilizer may be present in the concentrate mixture.

Prior to application, the CWM will be diluted with from zero to about 100 percent by weight of water (based on the weight of the concentrate mixture). The CWM may be applied without dilution by proper adjustment of the spraying equipment (fine nozzles and higher spray pressure). Preferably, however, the CWM is diluted to give from about 15 to about 25 percent solids based on the total weight of the compositions.

This invention may also be practiced by on-site mixing of the components. Water, the binder, and the stabilizer are blended in the spray tank. The whitening agent is then introduced and the resulting composition is thoroughly mixed before application. In this manner transportation costs can be further reduced.

Whitening Agent

The whitening agents which are employed in this invention comprise common light colored mineral materials such as siliceous kaolinite clay, titanium dioxide, talc, gypsum, limestone, etc. The preferred material is siliceous kaolinite clay because of (1) its effectiveness and (2) its low cost. Titanium dioxide is very effective, but its high cost makes it less desirable from a practical standpoint. For increased effectiveness at reasonable cost, a minor amount of titanium dioxide may be combined with the kaolinite clay or other low-cost whitening agent.

For example, the whitening agent may be comprised of from 80–98 percent of a low-cost whitening agent such as kaolinite clay and from 20–2 percent of titanium dioxide, preferably from about 95–98 percent of Kaolinite clay and from 5–2 percent of titanium dioxide.

The Binder

The binders of this invention comprise wax emulsions.

The wax emulsions useful as binders in this invention are typically emulsions of paraffin wax in water. The waxes must have a softening point in the range of 150° to 200° F. Waxes having softening points less than 150° F. yellow upon application, reducing the reflective capabilities of the white mulch. If the wax has a softening point above 200° F., penetration of the dried white mulch by the seedlings will be reduced.

Suitable waxes include microcrystalline and oxidized microcrystalline waxes having melting points in the range of 180° – 200° F., vegetable waxes such as Carnauba wax having a melting point in the range of 186° – 194° F., Candellia wax from a Mexican cactus having a melting point in the range of 163° – 170° F., oxidized Fischer-Tropsch waxes having melting points in the range of 180° – 200° F., paraffinic waxes having melting points in the range of 160° to 165° F., and bleached Montan wax having a melting point in the range of 180° – 200° F.

Wax-polyethylene combinations having melting points in the range of 150° – 200° F. are also suitable.

Emulsifiers which can be used to prepare the wax emulsions include fatty acid salts of metals and amines such as the alkanolamines, i.e., ethanolamine, triethanolamine, etc. Examples of suitable emulsifiers of this class include monoethanol amine stearate, diethanol amine stearate, diethanol amine oleate, alkyl sulfates, salts of ligno sulfates such as calcium ligno sulfate, alkyl benzene sulfonates and alpha olefin sulfonates.

Vinsol resin can also be used to prepare the wax emulsion as can cationic and non-ionic emulsifiers.

The emulsifier level in the emulsion ranges from about one to 10 percent by weight, preferably from about two to 10 percent, and the wax content of the emulsion will be in the range of about 15 to 60 percent by weight, preferably in the range of 40 to 50 percent by weight.

A preferred wax emulsion comprises from about 25 to about 35 percent by weight of a paraffin wax with a melting point of 160°–165° F, from about three to about five percent by weight of polyethylene, from about two to about four percent by weight of stearic acid, from 0.01 to about 0.1 percent by weight of a thickening agent such as Carbopol, from about 0.5 to about 1.1 percent potassium hydroxide, with the balance to make 100 percent being water.

In some instances, a minor portion of the binder may optionally be an ethylene-vinyl ester emulsion copolymer, preferably a water emulsion latex of ethylene-vinyl ester emulsion copolymer. Hence the binder will be a wax emulsion to which may be added up to about 40 percent of an ethylene-vinyl ester emulsion copolymer. Such esters are derived from monocarboxylic fatty acids of one to six carbon atoms. The copolymers will generally have a molecular weight on the order of 100,000 or greater. They will have a glass transition temperature (Tg) of less than 15° C., preferably less than 10° C. The emulsions will generally have a solids content of from 20 to 80 percent, preferably from 40 to 60 percent by weight. The emulsions may contain either a nonionic or ionic emulsifier as colloid-stabilizing agents such as polyvinyl alcohol, partially acetylated polyvinyl alcohol, casein, etc.

The ethylene-vinyl acetate emulsion copolymers are described in the article by M. K. Lindemann, "Vinyl Acetate-Ethylene Emulsion Copolymers," Paint Manufacture (September, 1968), pp. 30–36. Examples of the materials are disclosed in British Pat. No. 1.068,976, published May 17, 1967. The materials are produced by copolymerization of vinyl acetate and ethylene in an aqueous medium under pressures not exceeding 100 atmospheres in the presence of a free-radical-forming catalyst and a nonionic emulsifying agent, the aqueous system being maintained by a suitable buffering agent at a pH of 2 to 6. The particle size of the emulsion (usually 0.1 to 1.0 microns) may be regulated by the amount of emulsifier which is employed in the system and by the addition of a colloid-stabilizing agent.

The ratio of ethylene to vinyl acetate in the vinyl copolymer is influenced by the pressure, agitation, and viscosity of the polymerization medium. Thus, increasing ethylene content will occur with higher pressures, greater agitation of the mixture, and low viscosity of the polymerization mixture.

Stabilizers

The stabilizers or dispersants used in this invention act to prevent settling or separation of the dispersed material by forming a barrier between the dispersed particles or, in some cases, by thickening the continuous medium. Where the constituents of the mulch are mixed in the field as in Example 1, stabilizers are not required.

Application of the White Mulch Composition

The white mulch composition can most efficiently be applied by use of conventional farm spraying equipment such as that used for applying liquid pesticide or fertilizers. Generally this is accomplished by mounting nozzles, for example TEE JET 6506 or 8006 to 6510 or 8010 sizes, on a hydraulically operated tool bar at the rear of the tractor so positioned that a band of mulch about 5 to 8 inches wide can be applied over each seed row. For the most complete coverage of the soil it is desirable to use 2 nozzles for each seed bed, each directed at an angle from the vertical of about 30° but both remaining in a vertical plane perpendicular to the direction of forward motion but angling in opposite directions to one another, i.e., toward each other. This prevents a "shadowing" effect by large soil particles and clods and gives a highly uniform and continuous application of the mulch coverage. The spray nozzles are generally connected by flexible tubing to a common manifold into which the mulch flows from a manually controlled valve. Mulch is usually carried on the tractor in tanks mounted along either sides of the engine and is fed to the control valve and manifold by a pump run by the power takeoff of the tractor. A "Deming" brand gear pump works well in this service.

By appropriate set-up, planting and mulching can be accomplished in a single operation, that is, one tractor can both plant and apply the mulch in one pass. By varying the nozzle sizes, a more dilute or concentrated form may be applied as the individual situation dictates. Alternatively, hand-spraying devices may be utilized where small areas are to be treated.

The white mulch is usually applied at a rate of from about 100 to about 800 gallons per acre, preferably from about 300 to about 500 gallons per acre, corresponding to from about 400 to about 3,400 pounds of solids per acre and from about 1,200 to about 2,100 pounds of solids per acre, respectively. This rate of application assumes total coverage of the area being treated. In most applicatons, however, the mulch will be applied in strips covering the rows of planted seeds. The actual amount applied per acre of the treated field may range from about 50 to about 400 gallons per acre, preferably from about 150 to about 250 gallons per acre corresponding to from about 200 to about 1,700 and from about 600 to about 1,050 pounds of solids per acre of treated field, respectively.

The rate of application will depend upon the type of soil (a sandy soil will require a smaller quantity vis-a-vis a rough cloddy soil), the degree of preparation of the soil, i.e., its smoothness, and the particular crop. The soil should be as smooth as possible to give even coating and should not be excessively wet since the mulch will dry too slowly and may even run off.

After the application of the white mulch composition in the above-described manner, it becomes resistant to rain within about 30 minutes to a few hours. The time will vary depending on the humidity, amount of overcast, the type of soil, the rate of application, the temperature, the concentration of the mulch, etc.

The Cured Mulch Surface

The cured mulch surface (after application and removal of substantially all water) comprises (based on the total weight of the cured surface) (1) from about 85 to about 98 parts by weight of whitening agent, preferably from about 87 to about 96 and from (2) about 15 to about two parts by weight of solids from the latex binder, preferably from about 13 to about four parts by weight. If a stabilizer has been used, the cured mulch surface will contain from about 0 to about 0.25 parts by weight of solids from the stabilizer.

EXAMPLES

Example 1

A white mulch was prepared by mixing 20.6 parts of a white siliceous kaolinite clay (Mono 90), 2 parts of titanium dioxide, 61.4 parts water, 0.5 part thickener, and 15.5 parts of a wax emulsion having the following composition:
1. 33.8 parts paraffin wax with a melting point of 160–165°F.
2. 3.8 parts by weight of polyethylene
3. 3 parts stearic acid
4. 0.04 parts carbopol
5. 0.8 parts potassium hydroxide
6. 58.6 parts water.

The mixture was stirred until homogeneous.

The mulch was applied to a field in which cabbage seeds had been planted the same day. Over a row 150 feet in length, three replications were made alternating 25 feet of white mulch and 25 feet of untreated soil. Twelve days after the mulch was applied the plants in each 25 foot strip were counted with the following results:

| Treatment | Strip | Cabbage plants per 25-foot strip | Average |
|---|---|---|---|
| White mulch | 1 | 331 | |
| Do | 2 | 350 | 310 |
| Do | 3 | 251 | |
| Untreated soil | 1 | 210 | |
| Do | 2 | 250 | 208 |
| Do | 3 | 164 | |

It is apparent that many widely different embodiments of this invention may be made without departing from the scope and spirit thereof; and, therefore, it is not intended to be limited except as indicated in the appended claims.

What is claimed is:

1. A white mulch composition for treatment of crop-producing soil to increase crop yield consisting essentially of (1) from about 10 to about 30 parts by weight of a whitening agent, (2) from about three to about six parts by weight of a wax emulsion binder having a wax constituent having a softening point in the range of from 150°–200° F, (3) from one to 10 parts by weight of an emulsifier, (4) from about 86 to about 53 parts by weight water, and (5) from zero to about one part by weight of a stabilizer, wherein said whitening agent is comprised of from about 95–98 percent by weight of kaolinite clay and from 5–2 percent by weight of titanium dioxide, with the proviso that the amount of water present is such to result in said composition being made up of 100 parts by weight.

* * * * *